US012668758B2

(12) United States Patent
Young et al.

(10) Patent No.: US 12,668,758 B2
(45) Date of Patent: Jun. 30, 2026

(54) FOAM CONTROL COMPOSITION

(71) Applicant: WACKER CHEMIE AG, Munich (DE)

(72) Inventors: John Young, Saline, MI (US); Hagit Levin, Ann Arbor, MI (US); Tianyue Zheng, Ann Arbor, MI (US)

(73) Assignee: Wacker Chemie AG, Munich (DE)

( * ) Notice: Subject to any disclaimer, the term of this patent is extended or adjusted under 35 U.S.C. 154(b) by 510 days.

(21) Appl. No.: 18/286,376

(22) PCT Filed: Apr. 12, 2021

(86) PCT No.: PCT/EP2021/059440
§ 371 (c)(1),
(2) Date: Oct. 11, 2023

(87) PCT Pub. No.: WO2022/218501
PCT Pub. Date: Oct. 20, 2022

(65) Prior Publication Data
US 2024/0191155 A1 Jun. 13, 2024

(51) Int. Cl.
| | |
|---|---|
| *C08G 77/02* | (2006.01) |
| *B01D 19/04* | (2006.01) |
| *C08K 3/36* | (2006.01) |
| *C08L 83/02* | (2006.01) |
| *C11D 3/00* | (2006.01) |
| *C11D 3/37* | (2006.01) |

(52) U.S. Cl.
CPC ........ *C11D 3/0026* (2013.01); *B01D 19/0409* (2013.01); *C08G 77/02* (2013.01); *C08K 3/36* (2013.01); *C11D 3/3738* (2013.01)

(58) Field of Classification Search
CPC .............................. C08G 77/02; C11D 3/0026
USPC ......................... 516/117, 119, 120, 136, 137
See application file for complete search history.

(56) References Cited

U.S. PATENT DOCUMENTS

| | | | | |
|---|---|---|---|---|
| 2,917,467 | A * | 12/1959 | Olson | ..................... C08G 77/06 528/425 |
| 6,005,132 | A * | 12/1999 | Weidner | .................... C07F 7/04 556/483 |
| 8,053,480 | B2 * | 11/2011 | Hilberer | ................. B01D 19/04 524/588 |
| 2004/0127363 | A1 * | 7/2004 | Guzman | ............... C07F 7/0838 504/193 |
| 2008/0021152 | A1 * | 1/2008 | Rautschek | ............. C11D 3/162 524/588 |
| 2017/0210763 | A1 * | 7/2017 | Krafczyk | ............... C08G 77/08 |
| 2023/0272166 | A1 * | 8/2023 | Fritz-Langhals | ....... C08L 83/04 524/588 |

FOREIGN PATENT DOCUMENTS

| | | |
|---|---|---|
| CN | 107921331 A | 4/2018 |
| EP | 1035184 A1 | 9/2000 |
| EP | 1075863 A2 | 2/2001 |
| JP | 2011207780 A * | 10/2011 |

OTHER PUBLICATIONS

"Fumed Silica used as Defoamer" authored by Lou and published on the website LinkedIn on Feb. 26, 2021.*
Translation of JP 2011-207780 (no date).*

* cited by examiner

*Primary Examiner* — Marc S Zimmer

(57) ABSTRACT

A foam control composition includes a component (A) and a component (B). Component (A) includes units of the formula $[SiO_{4/2}]_a[(R^1O)SiO_{3/2}]_b[(R^2O)SiO_{3/2}]_{b'}[(R^1O)_2SiO_{2/2}]_c[(R^1O)(R^2O)SiO_{2/2}]_{c'}[(R^2O)_2SiO_{2/2}]_{c''}[(R^1O)_3SiO_{1/2}]_d[(R^1O)_2(R^2O)SiO_{1/2}]_{d'}[(R^1O)(R^2O)_2SiO_{1/2}]_{d''}[(R^2O)_3SiO_{1/2}]_{d'''}$. Component (B) comprises a filler.

15 Claims, No Drawings

FOAM CONTROL COMPOSITION

The invention relates to foam control compositions. More particularly, the invention relates to a multi-component foam control composition. The invention also relates to a process for preparing a foam control composition and its use.

In aqueous systems which contain surfactants such as, for example, detergents, the generation of foam is undesirable under certain conditions. Thus, detergents will often include ingredients to control foam. For example, in laundering applications, the use of front load (drum-type) washing machines creates conditions wherein foam is easily generated. Siloxane-based defoamers have proven themselves particularly useful in these applications. However, such defoamers are typically complex and expensive to manufacture.

Additionally, grey water exiting a washing machine typically includes detergent, oil, and dirt, which is sent to a municipal facility for treatment and purification. Thus, laundering processes may provide a route for siloxanes to enter the ecosystem. Once in the environment, polydiorganosiloxanes (M-D type materials), such as polydimethylsiloxanes (PDMS), are known to decompose, due to the presence of the repeating dimethylsiloxy units, through a cyclization pathway to undesirable lower molecular weight cyclic siloxanes, such as octamethylcyclotetrasiloxane and decamethylcyclopentasiloxane, which are commonly associated with known polydiorganosiloxane defoamers. For example, alpha, omega-silanol terminated siloxane fluids are known to thermally decompose, forming cyclic siloxanes, and the terminal silanol group is regenerated. Decomposition or depolymerization of polydiorganosiloxanes may also occur by acid or alkaline catalysts, which attack the main chain of the polymer forming cyclic siloxanes and shorten fragments of the polymer.

Therefore, it would be desirable to provide a composition that can overcome the aforementioned deficiencies.

Embodiments of a foam control composition are provided.

In an embodiment, the foam control composition comprises a component (A) and a component (B). Component (A) comprises units of the formula $[SiO_{4/2}]_a[(R^1O)SiO_{3/2}]_b[(R^2O)SiO_{3/2}]_{b'}[(R^1O)_2SiO_{2/2}]_c[(R^1O)(R^2O)SiO_{2/2}]_{c'}[(R^2O)_2SiO_{2/2}]_{c''}[(R^1O)_3SiO_{1/2}]_d[(R^1O)_2(R^2O)SiO_{1/2}]_{d'}[(R^1O)(R^2O)_2SiO_{1/2}]_{d''}[(R^2O)_3SiO_{1/2}]_{d'''}$ in which
$R^1$ is a substituted or unsubstituted, linear or branched, hydrocarbon radical having 6 to 40 carbon atoms,
$R^2$ is a hydrogen or a saturated or unsaturated radical having 1 to 12 carbon atoms. The subscripts a, b, b', c, c', c'', d, d', d'', and d''' each have a value in a range of 0 to 100,000 subject to the limitation that a+b+b'+c+c'+c''+d+d'+d''+d''' is equal to 2 or more and that component (A) comprises $R^2$ radicals in a range of 0.1-20 mol % based on a sum of all $R^1$ and $R^2$ radicals in component (A). Component (B) comprises a filler.

In certain embodiments, the subscripts a, b, b', c, c', c'', d, d', d'', and d''' each have a value of 0 to 100.

In certain embodiments, a pair of adjacent carbon atoms of $R^1$ are interrupted by an oxygen or nitrogen atom.

Preferably, the composition comprises at least 85% by weight component (A).

In some embodiments, component (A) is a hydrophobic fluid that exhibits a surface tension of from 26-45 millinewtons per meter.

In other embodiments, component (A) has a weight-average molecular weight in a range of from 250-20,000 daltons.

In other embodiments, component (A) consists of units having silicon atoms chemically bonded to four oxygen atoms.

In an embodiment, component (A) comprises $R^2$ radicals in a range of 1-15 mol % based on a sum of all $R^1$ and $R^2$ radicals in component (A).

In other embodiments, $R^2$ is selected from the group consisting of hydrogen, methyl, and ethyl radicals. In an embodiment, $R^2$ comprises hydrogen radicals in an amount of 5 mol % or less based on the sum of all $R^1$ and $R^2$ radicals.

Preferably, the filler comprises an oxide of silicon, a metal oxide, or a mixture thereof.

In some embodiments, the composition further comprises a component (C). Component (C) is a resin that comprises M units and Q units. At least one M unit is of a formula $(R^3)_3SiO_{1/2}$ and at least one Q unit is of a formula $SiO_2$. In these embodiments, $R^3$ is a hydrogen atom, a saturated or unsaturated group having 1 to 40 carbon atoms, or a saturated or unsaturated group having 6 to 40 carbon atoms and at least one alkyl group single bonded to an oxygen atom.

In other embodiments, the composition further comprises a component (D). Component (D) includes one or more water-insoluble organic compounds. In certain of these embodiments, at least one of the one or more water-insoluble organic compounds has a boiling point of greater than 100° C. at 900-1100 hPa. In some embodiments, the composition exhibits a viscosity of 1-30,000 mPa·s at 25° C. and 1014.25 hPa and a density of 0.9-1.20 g/mL.

Embodiments of an aqueous detergent are also provided. In an embodiment, the aqueous detergent comprises an embodiment of the foam control composition and a surfactant system. The surfactant system comprises at least one surfactant.

It is to be understood that the invention may assume various alternative orientations and step sequences, except where expressly specified to the contrary. It is also to be understood that the specific materials, articles, and methods described in the following specification are simply exemplary embodiments of the inventive concepts. Hence, specific properties, conditions, or other physical characteristics relating to the embodiments disclosed are not to be considered as limiting, unless expressly stated otherwise.

In certain embodiments, a foam control composition is provided. The composition is suitable for use in controlling an amount of foam in an aqueous system. For example, the composition may be provided as a portion of an aqueous laundry detergent and utilized in laundering applications. However, the foam control composition is not limited to detergent applications and can be utilized in other kinds or types of cleaning compositions. Furthermore, the composition may be utilized in applications other than laundering. For example, the composition may also be suitable to control foam in applications such as, for example, textile, pulp, hard surface cleaning, wastewater, natural gas scrubbing, polymer dispersions, or have agricultural applications or other applications involving aqueous systems.

The foam control composition comprises a component (A). In some embodiments, component (A) is a hydrophobic fluid. Component (A) comprises organosilicon compounds. More preferably, component (A) comprises alkylsilicates. In particular, component (A) comprises units of the formula (I) $[SiO_{4/2}]_a[(R^1O)SiO_{3/2}]_b[(R^2O)SiO_{3/2}]_{b'}[(R^1O)_2SiO_{2/2}]_c[(R^1O)(R^2O)SiO_{2/2}]_{c'}[(R^2O)_2SiO_{2/2}]_{c''}[(R^1O)_3SiO_{1/2}]_d[(R^1O)_2(R^2O)SiO_{1/2}]_{d'}[(R^1O)(R^2O)_2SiO_2]_{d''}[(R^2O)_3SiO_{1/2}]_{d'''}$. In certain embodiments, $R^1$ is a substituted or unsubstituted, linear or branched, hydrocarbon radical having 6 to 40 carbon atoms and $R^2$ is a hydrogen or a saturated or unsaturated radical having 1 to 12 carbon atoms. The subscripts a, b, b', c, c', c", d, d', d", and d''' each have a value in a range of 0 to 100,000 subject to the limitation that a+b+b'+c+c'+c"+d+d'+d"+d''' is equal to 2 or more and that component (A) comprises $R^2$ radicals in a range of 0.1-20 mol % based on a sum of all $R^1$ and $R^2$ radicals in component (A).

As noted above, the subscripts a, b, b', c, c', c", d, d', d", and d''' each have a value in the range of 0 to 100,000. In certain embodiments, the subscripts a, b, b', c, c', c", d, d', d", and d''' each have a value in the range of 0 to 100. Preferably, the subscripts a, b, b', c, c', c", d, d', d", and d''' each have a value in the range of 0 to 50, more preferably, 0 to 10. It should be further noted that the value of a particular subscript a, b, b', c, c', c", d, d', d", d''' refers to the average content of the respective structural unit in a particular compound of component (A).

As noted above, the sum of the subscripts a, b, b', c, c', c", d, d', d", d''' is equal to 2 or more. In some embodiments, component (A) may comprise more [$SiO_{4/2}$] units than the sum of the [($R^1$O)$SiO_{3/2}$] and [($R^2$O)$SiO_{3/2}$] units. In other embodiments, component (A) may comprise less [$SiO_{4/2}$] units than the sum of the [($R^1$O)$SiO_{3/2}$] and [($R^2$O)$SiO_{3/2}$] units. In some embodiments, component (A) may comprise more [$SiO_{4/2}$] units than the sum of [($R^1$O)$_2SiO_{2/2}$], [($R^1$O) ($R^2$O)$SiO_{2/2}$], and [($R^2$O)$_2SiO_{2/2}$] units. In other embodiments, component (A) may comprise less [$SiO_{4/2}$] units than the sum of [($R^2$O)$_2SiO_{2/2}$], [($R^1$O)($R^2$O)$SiO_{2/2}$], and [($R^2$O)$_2$ $SiO_{2/2}$] units. In still other embodiments, component (A) may comprise more [$SiO_{4/2}$] units than the sum of the [($R^1$O)$_3SiO_{1/2}$], [($R^1$O)$_2$($R^2$O)$SiO_{1/2}$], [($R^1$O)($R^2$O)$_2$ $SiO_{1/2}$], and [($R^2$O)$_3SiO_{1/2}$] units. Alternatively, component (A) may comprise less [$SiO_{4/2}$] units than the sum of the [($R^1$O)$_3SiO_{1/2}$], [($R^1$O)$_2$($R^2$O)$SiO_{1/2}$], [($R^1$O)($R^2$O)$_2$ $SiO_{1/2}$], and [($R^2$O)$_3SiO_{1/2}$] units. In these embodiments, the sum of the subscripts a, b, b', c, c', c", d, d', d", d''' may be selected so that component (A) comprises 10-45 mol percentage (mol %) [$SiO_{4/2}$] units, 15-60 mol % [($R^1$O)$SiO_{3/2}$] and [($R^2$O)$SiO_{3/2}$] units, 15-60 mol % [($R^1$O)$_2SiO_{2/2}$], [($R^1$O)($R^2$O)$SiO_{2/2}$], and [($R^2$O)$_2SiO_{2/2}$] units, or 5-35 mol % [($R^2$O)$_3SiO_{1/2}$], [($R^1$O)$_2$($R^2$O)$SiO_{1/2}$], [($R^1$O) ($R^2$O)$_2SiO_{1/2}$], and [($R^2$O)$_3SiO_{1/2}$] units. In one such embodiment, component (A) comprises 1-10 mol % [$SiO_{4/2}$] units. In another embodiment, component (A) comprises 15-45 mol % [($R^1$O)$SiO_{3/2}$] and [($R^2$O)$SiO_{3/2}$] units. In other embodiments, component (A) comprises 15-45 mol % [($R^1$O)$_2SiO_{2/2}$], [($R^1$O)($R^2$O)$SiO_{2/2}$], and [($R^2$O)$_2SiO_{2/2}$] units. In still other embodiments, the sum of the subscripts a, b, b', c, c', c", d, d', d", d''' are selected so that component (A) comprises 15-35 mol % [($R^1$O)$_3SiO_{1/2}$], [($R^1$O)$_2$($R^2$O) $SiO_{1/2}$], [($R^1$O)($R^2$O)$_2SiO_{1/2}$], and [($R^2$O)$_3SiO_{1/2}$] units. It should be noted that when describing the mol % of a particular unit of component (A), the mol % described is based on the total number of units in component (A). The mol % of a particular type of unit is preferably determined based on standard analytical Nuclear Magnetic Resonance Spectroscopy $^{29}$Si(NMR) techniques. For determining the mol % of component (A), the units are defined in a range from −75 to −120 ppm within the $^{29}$Si(NMR) spectrum.

The radicals of $R^1$ and $R^2$ are selected independent from each other. In embodiments where $R^1$ is a substituted or unsubstituted, linear or branched, hydrocarbon radical having 6 to 40 carbon atoms, adjacent carbon atoms of $R^1$ may be interrupted by one or more atoms of oxygen (O) or nitrogen (N). In other embodiments, $R^2$ is selected from the group consisting of hydrogen, methyl, and ethyl radicals. In an embodiment, $R^2$ comprises hydrogen radicals in an amount of 9 mol % or less based on the sum of all $R^1$ and $R^2$ radicals in component (A). Preferably, $R^2$ comprises hydrogen radicals in an amount of 5 mol % or less based on the sum of all $R^1$ and $R^2$ radicals in component (A). As noted above, component (A) may comprises $R^2$ radicals in a range of 0.1-20 mol % based on a sum of all $R^1$ and $R^2$ radicals in component (A). However, in some embodiments, component (A) comprises $R^2$ radicals in a range of 1-15 mol % based on a sum of all $R^1$ and $R^2$ radicals in component (A).

Advantageously, it has been discovered that when component (A) comprises alkylsilicates, the foam control composition can control an amount of foam in, for example, an aqueous system. Additionally, including the units of the formula described above in component (A) may prevent the decomposition of component (A) into a cyclic diorganosiloxanes. In embodiments where component (A) comprises polyalkylsilicates, component (A) comprises units having silicon atoms chemically bonded to four oxygen atoms. Preferably, the polyalkylsilicates of component (A) do not include any SiC-bonded radicals. In these embodiments, component (A) may comprise 90% by weight polyalkylsilicates based on the total weight of component (A). Preferably, in these embodiments, component (A) comprises 95% by weight polyalkylsilicates based on the total weight of component (A). The % by weight of component (A) is preferably determined based on standard analytical $^{29}$Si (NMR) techniques. For determining the mol % of component (A), the units are defined in a range from −75 to −120 ppm within the $^{29}$Si(NMR) spectrum and using standard analytical $^{29}$Si(NMR) techniques. In other embodiments, component (A) consists of units having silicon atoms chemically bound to four oxygen atoms.

The alkylsilicates of component (A) can be formed, for example, by hydrolysis of silane compounds such as, for example, chlorosilanes, alkoxychlorosilanes or alkoxysilanes of the general formula (II)

$$(R^1O)_mCl_{4-m}Si,$$

wherein m=0, 1, 2, 3, or 4, optionally in the presence of alcohols of the formula $R^2$OH, or by alcoholysis of the compounds ($R^2$O)$_4$Si with $R^1$OH and water. Preferably, the $R^1$ groups of formula (II) are radicals that are each independently selected and which satisfy one of the conditions mentioned above for the radicals of $R^1$ of the formula (I) and each $R^2$ is a radical selected from the group consisting of hydrogen, methyl, and ethyl radicals.

Alternatively, the alkylsilicates of component (A) can be formed by reacting oligomeric or polymeric methoxy or ethoxy silicates with alcohols $R^1$OH, optionally in the presence of a catalyst. In this embodiment, the R's are radicals selected from the radicals which satisfy one of the conditions mentioned above for the radicals of $R^1$ of the formula (I). Suitable catalysts include, for example, alkali metal hydroxides, such as potassium hydroxide (KOH), or sodium methylate.

Alcohols suitable for use in forming component (A) can be selected from various primary, secondary, or tertiary saturated or unsaturated alcohols. In some embodiments, these alcohols have 6 to 40 carbon atoms. In some of these embodiments, the alcohol may include a pair of carbon atoms interrupted by one or more atoms of O or N. Examples of suitable alcohols include anisyl alcohol, benzyl alcohol, cinnamyl alcohol, carvacrol, citronellol, cis-6-nonen-1-ol, cis-3-octen-ol, cyclohexanol, 1-decanol, 6,8-dimethyl-nonan-2-ol, dihydrocarveol, 2,6-dimethylheptan-2-ol, ebanol, eugenol, geraniol, 1-heptanol, hydrocinnamyl alcohol, cis-3-hexanol, trans-3-hexanol, cis-4-heptenol, isoborneol, isoeugenol, isomethol, isopulegol, lauryl alcohol, linalool, linoleyl alcohol, menthol, a-methylbenzyl alcohol, nerol, nonyl alcohol, trans-2-nonen-1-ol, trans-2-cis-6-nonadienol, 1-octanol, 3-octanol, trans-2-octenol, oleyl alcohol, b-phenethyl alcohol, 2-phenylethanol, 3-phenylpropanol, 2-phenoxyethanol, stearyl alcohol, a-terpineol, tetrahydrogeraniol, tetrahydrolinalool, thymol and trimethylcyclohexanol. Commercially available materials suitable for use in forming component (A) may have alcohol alkoxylates groups with carbon atoms interrupted by an oxygen atom. Such alcohol alkoxylates are sold under the trademarks Ecosurf™ or Tergitol™ and are available from Dow Chemical Company or sold under the trademarks Emulan®, Lutensol® or Pluriol® and are available from BASF.

When formed, component (A) may be a substantially linear. However, component (A) may include branching. Also, as noted above component (A) may be a hydrophobic fluid. In some embodiments, it is preferred that component (A) has a surface tension of from 26-45 millinewtons per meter (mN/m), more preferably, 27-40 nM/m. The surface tension of component (A) can be measured utilizing a force tensiometer such as a Krüss K100 Force Tensiometer. To measure the surface tension of component (A), the tensiometer is first calibrated by using a calibration weight and should be measured to within +/−0.5 mg of the calibration weight. A deionized water sample is tested as a reference and should be measured to within +/−1.0 mN/m of 72.4 mN/m. Next, the surface tension of component (A) can be measured by filling a 4-ounce sample jar with 37.5 mL of component (A) and placing it on the vessel stage. The sample vessel stage is raised until the sample surface is just below the bottom of a platinum plated probe. The platinum plated probe may be cleaned prior to use with an external heating source. The surface tension measurements are taken at 22° C., using a wetting depth of 5 millimeters (mm), a speed up of 5 mm/min, and a speed down of 5 mm/min. Several measurements may be taken after the first reading, and the average can be calculated once equilibrium is reached to provide the surface tension.

In other embodiments, component (A) has a weight-average molecular weight in a range of from 250-20,000 daltons (Da). The number average molecular weight (Mw) of component (A) is preferably in the range of 500-8,000 Da. The weight-average molecular weight and the number average molecular weight can be determined by Size Exclusion Chromatography (SEC) utilizing a PLgel MIXED-B column, which has a length of 300 mm and a width of 7.5 mm and is available from Agilent Technologies, Inc., and a tetrahydrofuran (THF) mobile phase using a flow rate of 1 mL/min at 25° C. and an injection volume of 100 µL of a 1% solution of component (A) in THF. Moreover, component (A) may exhibit a viscosity in the range of from 1-30,000 mPa, measured under 10 (s−1) shear rate conditions at 25° C. by DIN 53019, preferably using a rheometer equipped with a cone and plate having 25 mm diameter. Preferably, under these conditions, component (A) exhibits a viscosity in the range of from 1-20,000 mPa·s. More preferably, under these conditions, component (A) exhibits a viscosity in the range of 1-10,000 mPa·s. The density of component (A) may be in the range of 0.9-1.20 grams/milliliter (g/mL) at 25° C. and measured as described in methods such as, for example, ASTM D333, ISO 2811, or DIN 51757. Unless indicated otherwise, the density of component (A) is measured at 1014.25 hPa and 20° C. or at a temperature typically associated with room temperature conditions.

Preferably, the foam control composition comprises at least 85% by weight component (A). However, the foam control composition also comprises a component (B). Component (B) comprises a filler. Preferably, component (B) is a filler. In some embodiments, the foam control composition comprises filler in an amount of 0.1-20 parts by weight, more preferably 1-10 parts by weight, based in each case on 100 parts by weight of component (A). The filler may be added to component (A) or component (B) in any combination.

The filler may be a single material or a mixture of discrete materials. Preferably, the filler used in the foam control composition includes materials having a BET surface area of 20-1000 m²/g. In certain embodiments, the filler comprises a material that has a particle size of less than 10 µm. In one such embodiment, the filler includes a material having a particle size of 1-10 µm. Suitable filler materials may have an agglomerate size of less than 100 µm.

Suitable filler materials include oxides of silicon such as, for example, silica ($SiO_2$). Suitable fillers also include metal oxides such as, for example, titanium dioxide and aluminum oxide. Metal soaps, finely ground quartz, PTFE powders, fatty acid amides, e.g. ethylenebisstearamide, and finely divided hydrophobic polyurethanes are also suitable materials that may be utilized as the filler. Mixtures of the above-mentioned materials are also suitable for use as the filler.

Preferred oxides of silicon have a BET surface area of 50 to 800 m²/g. These materials may be fumed or precipitated. Preferred filler materials are pretreated silicas, e.g., commercially available hydrophobic silicas. An example of a commercially available hydrophobic silica that may be suitable for use in the composition is HDK® H2000, which is a fumed silica treated with hexamethyldisilazanes and having a BET surface area of 140 m²/g, available from Wacker Chemie AG. Another example of a commercially available hydrophobic silica that may be suitable for use in the composition is Sipernat® D10, which is a precipitated, polydimethylsiloxane-treated silica having a BET surface area of 90 m²/g, available from Evonik Industries AG.

In some embodiments, the foam control composition comprises a component (C). In one such embodiment, component (C) is present in the foam control composition at 1-10 parts by weight based on 100 parts by weight of component (A). In these amounts, component (C) may be soluble or partially insoluble in component (A). Solubility can be measured by methods known in the art. In other embodiments, the weight ratio of component (B) to component (C) in the composition is in a range of 95:5 to 5:95. In one such embodiment, the weight ratio of component (B) to component (C) in the composition is in a range of 80:20 to 20:80.

In certain embodiment, component (C) is a resin. Preferably, the resin comprises siloxane units of two or more types. In some embodiments, the resin comprises M units and Q units. The molar ratio of M to Q units in the resin may be in the range from 0.5 to 2.0. Preferably, the molar ratio of M to Q units in the resin is in the range from 0.6 to 1.0. The solubility of the resin in component (A) may depend at least in part on the ratio of M to Q units in the resin.

In an embodiment, at least one M unit is of a formula $(R^3)_3SiO_2$ and at least one Q unit is of a formula $SiO_2$, wherein $R^3$ is a hydrogen atom, a saturated or unsaturated group having 1 to 40 carbon atoms, or a saturated or unsaturated group having 6 to 40 carbon atoms and at least one alkyl group single bonded to an oxygen atom. In other embodiments, the resin comprises units of the formula $R^3SiO_{3/2}$ or units of the formula $R^3{}_2SiO_{2/2}$. When provided, the $R^3SiO_{3/2}$ units or the $R^3{}_2SiO_{2/2}$ units are present in the resin in an amount from 0.01-20 mol % based on the sum of all of the units in component (C). Preferably, the $R^3SiO_{3/2}$ units or the $R^3{}_2SiO_{2/2}$ units are present in the resin in an amount from 0.01-5 mol % based on the sum of all of the units in component (C). The resin may also comprise up to 10 weight % of free, Si-bonded hydroxyl or alkoxy groups, such as methoxy or ethoxy groups.

In some embodiments, the resin may be a solid. In other embodiments, when measured at a temperature of 25° C. and at a pressure of 1014.25 hPa, the resin may exhibit a viscosity of greater than 1000 mPa·s measured under 10 (s−1) shear rate conditions using a rheometer equipped with a cone and plate of 25 mm diameter. The weight-average molecular weight determined by SEC (relative to a polystyrene standard) for the resins described above is preferably 200 to 200,000 grams/mol. More preferably, the weight-average molecular weight determined by SEC for the resins described above is 1000-20,000 grams/mol.

In some embodiments, the foam control composition comprises a component (D). Preferably, component (D) is provided in amounts from 0-1000 parts by weight, more preferably, 0-100 parts by weight, based in each case on 100 parts by weight of the total weight of components (A), (B) and, when used, (C). In these embodiments, component (D) might be utilized to provide the foam control composition as a dispersion. Preferably, component (D) comprises water-insoluble organic compounds having a boiling point of greater than 100° C. and at a pressure of 900-1100 hPa, in particular 1014.25 hPa. As used herein, the term "water-insoluble" means a solubility in water, at 25° C. and under a pressure of 1013.25 hPa, of not more than 2 percent by weight. Suitable water-insoluble organic compounds include mineral oils, natural oils, isoparaffins, polyisobutylenes, residues from the oxo-process alcohol synthesis, esters of low molecular mass synthetic carboxylic acids, such as pentane-1,3-diol diisobutyrate, fatty acid esters, such as octyl stearate, dodecyl palmitate, or isopropyl myristate, fatty alcohols, ethers of low molecular mass alcohols, phthalates, esters of phosphoric acid, and waxes. Polymers of polypropylene glycol with a number average molecular weight of 2000 to 4000, as well as block copolymers based on ethylene oxide and propylene oxide having an average molecular weight of 2700 to 5000 and hydrophillic-lypophillic balance (HLB) of 1 to 7, sold under the trademarks Pluronic® and Tetronic® from BASF may also be employed.

Preferably, when formed, the foam control composition is a viscous mixture of components and when viewed is clear to opaque and colorless to brownish in appearance. In certain embodiments, the foam control composition exhibits a viscosity of 10-2,000,000 mPa·s, preferably, 2,000-50,000 mPa·s, in each case measured at 25° C. and 1014.25 hPa by DIN 53019, preferably using a rheometer equipped with a cone and plate of 25 mm diameter. The foam control composition can be prepared by known methods such as, for example, by mixing of all the desired components. Mixing the components can be accomplished by, for example, producing high shearing forces in colloid mills, dissolvers, or rotor-stator homogenizers. This mixing operation may take place under reduced pressure in order to prevent the incorporation of air which may be present in, for example, the filler.

The embodiments of the foam control composition can be utilized to reduce or prevent foam formation in aqueous systems, particularly foam generated by detergent compositions during laundering. Thus, the composition may be included in an aqueous detergent. Preferably, in these embodiments, the aqueous detergent comprises a surfactant system. The surfactant system comprises at least one surfactant. An anionic surfactant, a non-ionic surfactant, or a mixture thereof is suitable for use in the surfactant system. Surfactants known in the art may be utilized in the aqueous detergent. An example of a suitable anionic surfactant is sodium dodecyl benzene sulphonate. Suitable non-ionic surfactants include alcohol ethoxylates, which ensure effectiveness of detergent at lower washing temperatures, e.g. 40° C. However, other surfactants such as, for example, cationic surfactants, amphoteric surfactants, zwitterionic surfactants, and mixtures thereof may be included as a part of the surfactant system.

When the foam control composition is utilized in a liquid laundry detergent, the relative proportions of the components thereof can be adjusted to match the density of the detergent formulation. To avoid and reduce any chance of coalescence, creaming, sedimentation, or separation, it is preferred that the density of the foam control composition matches the density of the liquid laundry detergent that is provided by the combination of the other components, e.g. the surfactant system, in the detergent. Preferably, in these embodiments, the density of the foam control composition is 1.00-1.10 g/mL as defined in methods such as, for example, ASTM D333, ISO 2811, or DIN 51757. By matching the density of the foam control composition with the density of the liquid laundry detergent the compatibility problems mentioned above may be minimized.

It should be appreciated the foam control composition is not limited to use in a liquid laundry detergent. The foam control can be used in any application where undesired foam is to be minimized or eliminated. For example, in some embodiments, the foam control composition may be provided in a detergent or in another type of cleaning composition that is further formulated into an emulsion, a powder, a dispersion, or another form. Additionally, the foam control composition can be utilized in other known foam control applications where organosilicon compounds are known to be used.

The foam control composition can be provided in a liquid form such as, for example, an emulsion, a dispersion, or in another form, for example, a powder.

In embodiments where the foam control composition is provided in an emulsified form, emulsifiers known for the preparation of silicone emulsions may be utilized. Suitable examples include anionic, cationic, or nonionic emulsifiers. In some embodiments, it may be desirable to utilize a mixture of emulsifiers. In these embodiments, it is preferred that at least one nonionic emulsifier is utilized. Suitable nonionic emulsifiers include sorbitan fatty acid esters, ethoxylated sorbitan fatty acid esters, ethoxylated fatty acids, ethoxylated linear or branched alcohols having 10 to 20 carbon atoms, and/or glycerol esters. To increase the stability and shelf-life of the resulting emulsion, thickeners may be employed. Known thickener compounds such as, for example, polyacrylic acid, polyacrylates, cellulose ethers, such as carboxymethylcellulose and hydroxyethylcellulose, natural thickeners, such as xanthan gum, for example, and polyurethanes, and also preservatives and other customary additives can be employed as thickeners. Preferably, in these embodiments, the emulsion includes a continuous phase comprising water.

In embodiments where the foam control composition is provided as a dispersion, components (A), (B), and, when used, (C) may be dispersed in component (D). In this embodiment, component (D) may be a water-insoluble organic compound and form the continuous phase.

In embodiments where the foam control composition is provided as a powder, it may be preferred that the foam control composition include only components (A)-(C) with component (D) being optional. Providing the foam control composition in powder form is accomplished by methods known in the art such as, for example, spray drying or agglomerative granulation, and by utilizing known additives. Thus, as an example, when the foam control composition is in powder form, it preferably comprises 2-20 weight % of the foam control composition with 80 to 98 weight % of the powder comprising one or more additives. Suitable additives may include, for example, zeolites, sodium sulfate, sodium bicarbonate, sodium carbonate, cellulose derivates, urea (derivates) and sugars. These powders may also comprise waxes or organic polymers.

In the embodiments described above, the foam control composition may be used in a method for preventing and/or reducing foam formation in certain media where controlling foam is desired. Such a method may include providing the foam control and introducing the foam control composition into the media. The foam control composition can be introduced into the media in one of the forms, e.g. in a liquid, emulsion, dispersion, or another form, noted above. After introduction, the foam control composition may be mixed with the media to prevent or reduce foam.

EXAMPLES

The following examples are presented solely for the purpose of further illustrating and disclosing the embodiments of the foam control composition. Unless indicated otherwise, all parts and percentages used to describe the examples and preparations thereof relate to weight. Further, unless indicated otherwise, the following examples and preparations thereof were carried out at 1014.25 hPa and at 20° C. or at a temperature which comes about when the reactants are combined at 20° C. without additional heating or cooling.

Preparation of Example 1

44.2 grams (g) of a mixture of ethoxysilicates comprising monomeric, dimeric, and oligomeric compounds (TES40, available from Wacker Chemie AG) and 74.5 g of 2-phenylethanol, which is commercially available from Sigma-Aldrich, USA are added to a dry flask equipped with Dean-Stark apparatus, condenser. The mixture is then heated to 60° C. and 0.18 g of $Ti(OBu)_4$, which is commercially available from Sigma-Aldrich, USA, is added under $N_2$ to the flask. The mixture is then refluxed at 130° C. for 3 hours until no further ethanol is collected. Then 0.7 g of $H_2O$ is added, and the reaction is kept in reflux for another 3 hours until no further ethanol is collected. 24.7 g of ethanol was collected from the reaction, which corresponds to a conversion of approximately 88.0% of all the ethoxy groups present in the ethoxysilicate starting material. The mixture was cooled down to room temperature and additional volatiles were removed using a rotary evaporator to yield 86 g of a light yellow fluid. The fluid comprised units of the formula $[SiO_{4/2}]$, $[(RO)SiO_{3/2}]$, and $[(RO)_2SiO_{2/2}]$, where R=2-phenylethyl. The $[SiO_{4/2}]$ units were present at 4.3 mol %, the $[(RO)SiO_{3/2}]$ units were present at 26.9 mol %, and the $[(RO)_2SiO_{2/2}]$ units were present at 37.2 mol %. The units and composition of the fluid were determined by $^1$H-NMR and $^{29}$Si-NMR. The average molecular weight of the fluid was 900 Da, which was determined by SEC.

Preparation of Example 2

28.6 g of a mixture of ethoxysilicates comprising monomeric, dimeric, and oligomeric compounds (TES40 available from Wacker Chemie AG), 64.8 g of 3,3,5-trimethyl-cyclohexanol, which is commercially available from Sigma-Aldrich, USA, and 0.12 g of a sodium methylate solution are added to a dry flask equipped with Dean-Stark apparatus, condenser. The mixture is then heated to a temperature of 150-220° C. for 3 hours under $N_2$ until no more ethanol is collected. 18.8 g of ethanol was collected from the reaction, which corresponds to a conversion of approximately 90.0% of all the ethoxy groups present in the ethoxysilicate starting material. The mixture is then cooled to room temperature and 56 μL of concentrated HCl, which is commercially available from Sigma-Aldrich, USA is stirred into the mixture to neutralize the sodium methylate. The mixture is stirred for 10 minutes. Next, the mixture was filtered and additional volatiles were removed using a rotary evaporator to yield 64.5 g of a colorless fluid. The fluid comprised units of the formula $[SiO_{4/2}]$, $[(RO)SiO_{3/2}]$, and $[(RO)_2SiO_{2/2}]$, where R=trimethylcyclohexyl. The $[SiO_{4/2}]$ units were present at 7.9 mol %, the $[(RO)SiO_{3/2}]$ units were present at 27.7 mol %, and the $[(RO)_2SiO_{2/2}]$ units were present at 20.9 mol %. The units and composition of the fluid were determined by $^1$H-NMR and $^{29}$Si-NMR. The average molecular weight of the fluid was 1200 Da as determined by SEC.

Preparation of Example 3

26.1 g of a mixture of ethoxysilicates comprising monomeric, dimeric, and oligomeric compounds (TES40 available from Wacker Chemie AG), 59.7 g of 3,3,5-trimethyl-cyclohexanol, which is commercially available from Sigma-Aldrich, USA, and 0.10 g of a sodium methylate solution are added to a dry flask equipped with Dean-Stark apparatus, condenser. The mixture is then heated to a temperature of 150-220° C. for 3 hours under $N_2$ until no more ethanol is collected. The mixture is then cooled to 100° C. and 0.35 g of water is added to the mixture, which is then heated to 150-220° C. for another 3 hours until no more ethanol is collected. 17.3 g of ethanol was collected from the reaction, which corresponds to a conversion of approximately 90.0% of all the ethoxy groups present in the ethoxysilicate starting material. Next, the mixture is cooled to room temperature and 48 μL of concentrated HCl, which is commercially available from Sigma-Aldrich, USA is stirred into the mixture to neutralize the sodium methylate. The mixture is stirred for 10 minutes. The mixture was filtered and additional volatiles were removed using a rotary evaporator to yield 63 g of a colorless fluid. The fluid comprised units of the formula $[SiO_{4/2}]$, $[(RO)SiO_{3/2}]$, and $[(RO)_2SiO_{2/2}]$, where R=trimethylcyclohexyl. The $[SiO_{4/2}]$ units were present at 2.4 mol %, the $[(RO)SiO_{3/2}]$ units were present at 29.0 mol %, and the $[(RO)_2SiO_{2/2}]$ units were present at 24.7 mol %. The units and composition of the fluid were determined by $^1$H-NMR and $^{29}$Si-NMR. The average molecular weight of the fluid was 1187 Da as determined by SEC.

Preparation of Example 4

30.9 g of a mixture of ethoxysilicates comprising monomeric, dimeric, and oligomeric compounds (TES40 available from Wacker Chemie AG), 66.6 g of 2-phenyl-1-propanol, which is commercially available from Sigma-Aldrich, USA, and 0.12 g of a sodium methylate solution are added to a dry flask equipped with Dean-Stark apparatus, condenser. The mixture is then heated to a temperature of 150-220° C. for 3 hours under $N_2$ until no more ethanol is collected. 19.8 g of ethanol was collected from the reaction, which corresponds to a conversion of approximately 90.0% of all the ethoxy groups present in the ethoxysilicate starting material. The mixture is then cooled to room temperature and 56 µL of concentrated HCl, which is commercially available from Sigma-Aldrich, USA is stirred into the mixture to neutralize the sodium methylate. The mixture is stirred for 10 minutes. Next, the mixture was filtered and additional volatiles were removed using a rotary evaporator to yield 72 g of a colorless fluid. The fluid comprised units of the formula $[SiO_{4/2}]$, $[(RO)SiO_{3/2}]$, and $[(RO)_2SiO_{2/2}]$, where R=2-phenylpropyl. The $[SiO_{4/2}]$ units were present at 6.6 mol %, the $[(RO)SiO_{3/2}]$ units were present at 24.6 mol %, and the $[(RO)_2SiO_{2/2}]$ units were present at 22.7 mol %. The units and composition of the fluid were determined by $^1$H-NMR and $^{29}$Si-NMR. The average molecular weight of the fluid was 1186 Da as determined by SEC.

Preparation of Example 5

31.6 g of a mixture of ethoxysilicates comprising monomeric, dimeric, and oligomeric compounds (TES40 available from Wacker Chemie AG), 68.2 g of 2-phenyl-1-propanol, which is commercially available from Sigma-Aldrich, USA, and 0.12 g of a sodium methylate solution are added to a dry flask equipped with Dean-Stark apparatus, condenser. The mixture is then heated to a temperature of 150-220° C. for 3 hours under $N_2$ until no more ethanol is collected. The mixture is then cooled to 100° C. and 0.44 g of water is added to the mixture, which is then heated to a temperature of 150-220° C. for another 3 hours until no more ethanol is collected. 23.1 g of ethanol was collected from the reaction, which corresponds to a conversion of approximately 90.0% of all the ethoxy groups present in the ethoxysilicate starting material. Next, 56 µL of concentrated HCl, which is commercially available from Sigma-Aldrich, USA is stirred into the mixture into the mixture to neutralize the sodium methylate. The mixture is stirred for 10 minutes. The mixture was filtered and additional volatiles were removed using a rotary evaporator to yield 74 g of a slightly yellow fluid. The fluid comprised units of the formula $[SiO_{4/2}]$, $[(RO)SiO_{3/2}]$, and $[(RO)_2SiO_{2/2}]$, where R=2-phenylpropyl. The $[SiO_{4/2}]$ units were present at 5.7 mol %, the $[(RO)SiO_{3/2}]$ units were present at 27.2 mol %, and the $[(RO)_2SiO_{2/2}]$ units were present at 23.4 mol %. The units and composition of the fluid were determined by $^1$H-NMR and $^{29}$Si-NMR. The average molecular weight of the fluid was 1186 Da as determined by SEC.

Preparation of Example 6

30.8 g of a mixture of ethoxysilicates comprising monomeric, dimeric, and oligomeric compounds (TES40 available from Wacker Chemie AG), 66.7 g of 3-phenyl-1-propanol, which is commercially available from Sigma-Aldrich, USA, and 0.18 g of a sodium methylate solution are added to a dry flask equipped with Dean-Stark apparatus, condenser. The mixture is then heated to a temperature of 150-220° C. for 3 hours under $N_2$ until no more ethanol is collected. 19.5 g of ethanol was collected from the reaction, which corresponds to a conversion of approximately 87.0% of all the ethoxy groups present in the ethoxysilicate starting material. The mixture is then cooled to room temperature and 84 µL of concentrated HCl, which is commercially available from Sigma-Aldrich, USA is stirred into the mixture to neutralize the sodium methylate. The mixture is stirred for 10 minutes. Next, the mixture was filtered and additional volatiles were removed using a rotary evaporator to yield 76 g of a colorless fluid. The fluid comprised units of the formula $[SiO_{4/2}]$, $[(RO)SiO_{3/2}]$, and $[(RO)_2SiO_{2/2}]$, where R=3-phenylpropyl. The $[SiO_{4/2}]$ units were present at 6.6 mol %, the $[(RO)SiO_{3/2}]$ units were present at 21.3 mol %, and the $[(RO)_2SiO_{2/2}]$ units were present at 31.4 mol %. The units and composition of the fluid were determined by $^1$H-NMR and $^{29}$Si-NMR. The average molecular weight of the fluid was 1270 Da as determined by SEC.

Preparation of Example 7

29.9 g of a mixture of ethoxysilicates comprising monomeric, dimeric, and oligomeric compounds (TES40 available from Wacker Chemie AG), 73.2 g of geraniol, which is commercially available from Sigma-Aldrich, USA, and 0.11 g of a sodium methylate solution are added to a dry flask equipped with Dean-Stark apparatus, condenser. The mixture is then heated to a temperature of 150-220° C. for 3 hours under $N_2$ until no more ethanol is collected. 19.0 g of ethanol was collected from the reaction, which corresponds to a conversion of approximately 87.0% of all the ethoxy groups present in the ethoxysilicate starting material. The mixture is then cooled to room temperature and 55 µL of concentrated HCl, which is commercially available from Sigma-Aldrich, USA is stirred into the mixture to neutralize the sodium methylate. The mixture is stirred for 10 minutes. Next, the mixture was filtered and additional volatiles were removed using a rotary evaporator to yield 84 g of a light yellow fluid. The fluid comprised units of the formula $[SiO_{4/2}]$, $[(RO)SiO_{3/2}]$, and $[(RO)_2SiO_{2/2}]$, where R=$C_{10}H_{17}$. The $[SiO_{4/2}]$ units were present at 6.0 mol %, the $[(RO)SiO_{3/2}]$ units were present at 21.4 mol %, and the $[(RO)_2SiO_{2/2}]$ units were present at 25.6 mol %. The units and composition of the fluid were determined by $^1$H-NMR and $^{29}$Si-NMR. The average molecular weight of the fluid was 1550 Da as determined by SEC.

Preparation of Example 8

20.7 g of a mixture of ethoxysilicates comprising monomeric, dimeric, and oligomeric compounds (TES40 available from Wacker Chemie AG), 88.6 g of oleyl alcohol, which is commercially available from Sigma-Aldrich, USA, and 0.08 g of a sodium methylate solution are added to a dry flask equipped with Dean-Stark apparatus, condenser. The mixture is then heated to a temperature of 150-220° C. for 3 hours under $N_2$ until no more ethanol is collected. 12.9 g of ethanol was collected from the reaction, which corresponds to a conversion of approximately 85.0% of all the ethoxy groups present in the ethoxysilicate starting material. The mixture is then cooled to room temperature and 38 µL of concentrated HCl, which is commercially available from Sigma-Aldrich, USA is stirred into the mixture to neutralize the sodium methylate. The mixture is stirred for 10 minutes. Next, the mixture was filtered and additional volatiles were removed using a rotary evaporator to yield 97 g of a yellow fluid. The fluid comprised units of the formula $[SiO_{4/2}]$, $[(RO)SiO_{3/2}]$, and $[(RO)_2SiO_{2/2}]$, where R=oleyl. The $[SiO_{4/2}]$ units were present at 6.7 mol %, the $[(RO)SiO_{3/2}]$ units were present at 22.0 mol %, and the $[(RO)_2SiO_{2/2}]$ units were present at 23.0 mol %. The units and composition of the fluid were determined by $^1$H-NMR and $^{29}$Si-NMR. The average molecular weight of the fluid was 2872 Da as determined by SEC.

Preparation of Example 9

38.1 g of a mixture of ethoxysilicates comprising monomeric, dimeric, and oligomeric compounds (TES40 available from Wacker Chemie AG), 65.7 g of benzyl alcohol, which is commercially available from Sigma-Aldrich, USA, and 0.12 g of a sodium methylate solution are added to a dry flask equipped with Dean-Stark apparatus, condenser. The mixture is then heated to a temperature of 150-220° C. for 3 hours under $N_2$ until no more ethanol is collected. 25.7 g of ethanol was collected from the reaction, which corresponds to a conversion of approximately 92.0% of all the ethoxy groups present in the ethoxysilicate starting material. The mixture is then cooled to room temperature and 58 µL of concentrated HCl, which is commercially available from Sigma-Aldrich, USA is stirred into the mixture to neutralize the sodium methylate. The mixture is stirred for 10 minutes. Next, the mixture was filtered and additional volatiles were removed using a rotary evaporator to yield 76 g of a colorless fluid. The fluid comprised units of the formula $[SiO_{4/2}]$, $[(RO)SiO_{3/2}]$, and $[(RO)_2SiO_{2/2}]$, where R=benzyl. The $[SiO_{4/2}]$ units were present at 3.4 mol %, the $[(RO)SiO_{3/2}]$ units were present at 18.9 mol %, and the $[(RO)_2SiO_{2/2}]$ units were present at 35.0 mol %. The units and composition of the fluid were determined by $^1$H-NMR and $^{29}$Si-NMR. The average molecular weight of the fluid was 1212 Da as determined by SEC.

Preparation of Example 10

20.0 g of a mixture of ethoxysilicates comprising monomeric, dimeric, and oligomeric compounds (TES40 available from Wacker Chemie AG), 21.7 g of 3-phenyl-1-propanol, which is commercially available from Sigma-Aldrich, USA, 42.6 g of oleyl alcohol, which is commercially available from Sigma-Aldrich, USA, and 0.08 g of a sodium methylate solution are added to a dry flask equipped with Dean-Stark apparatus, condenser. The mixture is then heated to a temperature of 150-220° C. for 3 hours under $N_2$ until no more ethanol is collected. 12.9 g of ethanol was collected from the reaction, which corresponds to a conversion of approximately 85.0% of all the ethoxy groups present in the ethoxysilicate starting material. The mixture is then cooled to room temperature and 40 µL of concentrated HCl, which is commercially available from Sigma-Aldrich, USA is stirred into the mixture to neutralize the sodium methylate. The mixture is stirred for 10 minutes. Next, the mixture was filtered and additional volatiles were removed using a rotary evaporator to yield 71 grams of a yellow fluid. The fluid comprised units of the formula $[SiO_{4/2}]$, $[(RO)SiO_{3/2}]$, and $[(RO)_2SiO_{2/2}]$, where R=oleyl or 3-phenylpropyl. The $[SiO_{4/2}]$ units were present at 7.4 mol %, the $[(RO)SiO_{3/2}]$ units were present at 22.2 mol %, and the $[(RO)_2SiO_{2/2}]$ units were present at 25.2 mol %. The units and composition of the fluid were determined by $^1$H-NMR and $^{29}$Si-NMR.

Preparation of Example 11

20.3 g of a mixture of ethoxysilicates comprising monomeric, dimeric, and oligomeric compounds (TES40 available from Wacker Chemie AG), 14.4 g of benzyl alcohol, which is commercially available from Sigma-Aldrich, USA, 43.2 g of oleyl alcohol, which is commercially available from Sigma-Aldrich, USA, and 0.07 g of a sodium methylate solution are added to a dry flask equipped with Dean-Stark apparatus, condenser. The mixture is then heated to a temperature of 150-220° C. for 3 hours under $N_2$ until no more ethanol is collected. 13.1 g of ethanol was collected from the reaction, which corresponds to a conversion of approximately 85.0% of all the ethoxy groups present in the ethoxysilicate starting material. The mixture is then cooled to room temperature and 40 µL of concentrated HCl, which is commercially available from Sigma-Aldrich, USA is stirred into the mixture to neutralize the sodium methylate. The mixture is stirred for 10 minutes. Next, the mixture was filtered and additional volatiles were removed using a rotary evaporator to yield 67 grams of a yellow fluid. The fluid comprised units of the formula $[SiO_{4/2}]$, $[(RO)SiO_{3/2}]$, and $[(RO)_2SiO_{2/2}]$, where R=oleyl or benzyl. The $[SiO_{4/2}]$ units were present at 7.6 mol %, the $[(RO)SiO_{3/2}]$ units were present at 19.1 mol %, and the $[(RO)_2SiO_{2/2}]$ units were present at 26.5 mol %. The units and composition of the fluid were determined by $^1$H-NMR and $^{29}$Si-NMR.

Examples 1-15

Examples 1-15, which are described below and shown TABLE 1, illustrate certain embodiments of the foam control composition.

To prepare the foam control compositions of Examples 1-11, 87.0 parts of each product of the Preparation of Examples 1-11 was mixed in a dissolver at room temperature for 10 minutes with 3.0 parts of a component (B), 5.0 parts of a component (C), and 5.0 parts of a component (D). Each of components (B)-(D) was as described below. Component B is a hydrophobic polydimethylsiloxane-treated silica having a BET surface area of 90 m2/g. Component (C) is a silicone resin solid at room temperature that was shown by $^{29}$Si-NMR and IR analysis to consist of 40 mol % of $CH_3SiO_{1/2}$ units, 50 mol % of $SiO_{4/2}$ units, 8 mol % of $C_2H_5OSiO_{3/2}$ units, and 2 mol % of $HOSiO_{3/2}$ units and have a weight-average molar mass of 7900 grams/mol (relative to the polystyrene standards ranging from 296 grams/mol to 3,150,000 grams/mol). Component (D) is a hydrocarbon mixture having a boiling range in the range of 235-270° C.

To prepare the foam control composition of Example 12, 100.0 parts of the product of the Preparation of Example 5 was mixed in a dissolver at room temperature for 10 minutes.

To prepare the foam control composition of Example 13, 87.0 parts of the product of the Preparation of Example 5 was mixed in a dissolver at room temperature for 10 minutes with 3.0 parts of a component (B). Component (B) was as described above.

To prepare the foam control composition of Example 14, 87.0 parts of the product of the Preparation of Example 5 was mixed in a dissolver at room temperature for 10 minutes with 5.0 parts of a component (C). Component (C) was as described above.

To prepare the foam control composition of Example 15, 92.0 parts of the product of the Preparation of Example 5 was mixed in a dissolver at room temperature for 10 minutes with 3.0 parts of a component (B) and 5.0 parts of a component (C). Components (B) and (C) were as described above.

TABLE 1

| Examples | Component (A) | Component (B) | Component (C) | Component (D) |
|---|---|---|---|---|
| Example 1 | 87.0 parts of Preparation of Example 1 | 3.0 parts | 5.0 parts | 5.0 parts |
| Example 2 | 87.0 parts of Preparation of Example 2 | 3.0 parts | 5.0 parts | 5.0 parts |
| Example 3 | 87.0 parts of Preparation of Example 3 | 3.0 parts | 5.0 parts | 5.0 parts |
| Example 4 | 87.0 parts of Preparation of Example 4 | 3.0 parts | 5.0 parts | 5.0 parts |
| Example 5 | 87.0 parts of Preparation of Example 5 | 3.0 parts | 5.0 parts | 5.0 parts |
| Example 6 | 87.0 parts of Preparation of Example 6 | 3.0 parts | 5.0 parts | 5.0 parts |
| Example 7 | 87.0 parts of Preparation of Example 7 | 3.0 parts | 5.0 parts | 5.0 parts |
| Example 8 | 87.0 parts of Preparation of Example 8 | 3.0 parts | 5.0 parts | 5.0 parts |
| Example 9 | 87.0 parts of Preparation of Example 9 | 3.0 parts | 5.0 parts | 5.0 parts |
| Example 10 | 87.0 parts of Preparation of Example 10 | 3.0 parts | 5.0 parts | 5.0 parts |
| Example 11 | 87.0 parts of Preparation of Example 11 | 3.0 parts | 5.0 parts | 5.0 parts |
| Example 12 | 100 parts of Preparation of Example 5 | 0 parts | 0 parts | 0 parts |
| Example 13 | 87.0 parts of Preparation of Example 5 | 3.0 parts | 0 parts | 0 parts |
| Example 14 | 87.0 parts of Preparation of Example 5 | 0 parts | 5.0 parts | 0 parts |
| Example 15 | 92.0 parts of Preparation of Example 5 | 3.0 parts | 5.0 parts | 0 parts |

The foam control performance of Examples 1-15 versus a comparative example, Comparative Example 1, is reported in TABLE 2. The foam control performance of each of Examples 1-15 was measured using a rotating cylinder test as described below.

Each rotating cylinder test for the inventive examples included adding 0.0025 parts of the respective foam control composition of Examples 1-15 to 100 parts of a commercially available liquid detergent, which included both a non-ionic surfactant and an anionic surfactant, to form a detergent solution. Then 1.8 parts of each detergent solution was added to 300 parts of distilled water to form a mixture. The resulting mixtures were each then added separately to a cylinder and tested. Before each rotating cylinder test was performed, the cylinder was sealed. After sealing the cylinder, the cylinder was rotated for 12 minutes at 30 rpm. Comparative Example 1 was a mixture comprising 1.8 parts of the commercially available liquid detergent and 300 parts of distilled water. Comparative Example 1 did not include any of the materials of Examples 1-15. Comparative Example 1 was also tested using the rotating cylinder test described above.

After rotating the cylinder as described above, the foam height was immediately measured for the mixtures that included the compositions of Examples 1-15 and Comparative Example 1 and the foam height was recorded in mm.

TABLE 2

| Mixtures | Foam Height |
|---|---|
| Comparative Example 1 | 300 |
| Mixture including Example 1 | 240 |
| Mixture including Example 2 | 280 |
| Mixture including Example 3 | 240 |
| Mixture including Example 4 | 140 |
| Mixture including Example 5 | 135 |
| Mixture including Example 6 | 230 |
| Mixture including Example 7 | 180 |
| Mixture including Example 8 | 260 |
| Mixture including Example 9 | 210 |
| Mixture including Example 10 | 220 |
| Mixture including Example 11 | 210 |
| Mixture including Example 12 | 300 |
| Mixture including Example 13 | 140 |
| Mixture including Example 14 | 300 |
| Mixture including Example 15 | 200 |

The lower the foam height reported in TABLE 2, the better the foam control performance. As illustrated in TABLE 2, none of the foam control compositions of Examples 1-15 increased the height of the foam produced after conducting the rotating cylinder test versus Comparative Example 1. In fact, the foam control compositions of Examples 1-11, 13, and 15 showed a decrease in the height of the foam produced versus Comparative Example 1 and each of these examples exhibited good to very good foam control.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

The invention claimed is:

1. A foam control composition, comprising:

a component (A) comprising units of the formula $[SiO_{4/2}]_a[(R^1O)SiO_{3/2}]_b[(R^2O)SiO_{3/2}]_{b'}[(R^1O)_2SiO_{2/2}]_c[(R^1O)(R^2O)SiO_{2/2}]_{c'}[(R^2O)_2SiO_{2/2}]_{c''}[(R^1O)_3SiO_{1/2}]_d[(R^1O)_2(R^2O)SiO_{1/2}]_{d'}[(R^1O)(R^2O)_2SiO_{1/2}]_{d''}[(R^2O)_3SiO_{1/2}]_{d'''}$ in which $R^1$ is a substituted or unsubstituted, linear or branched, hydrocarbon radical having 6 to 40 carbon atoms, $R^2$ is a hydrogen or a saturated or unsaturated radical having 1 to 12 carbon atoms, wherein the subscripts a, b, b', c, c', c'', d, d', d'', and d''' each have a value in a range of 0 to 100,000 subject to the limitation that a+b+b'+c+c'+c''+d+d'+d''+d''' is equal to 2 or more and that component (A) comprises $R^2$ radicals in a range of 0.1-20 mol % based on a sum of all $R^1$ and $R^2$ radicals in component (A); and a component (B) comprising a filler.

2. The composition of claim 1, further comprising a component (C), component (C) being a resin that comprises M units and Q units, wherein at least one M unit is of a formula $(R^3)_3SiO_{1/2}$ and at least one Q unit is of a formula $SiO_2$, wherein $R^3$ is a hydrogen atom, a saturated or unsaturated group having 1 to 40 carbon atoms, or a saturated or unsaturated group having 6 to 40 carbon atoms and at least one alkyl group single bonded to an oxygen atom.

3. The composition of claim 1, further comprising a component (D) including one or more water-insoluble organic compounds.

4. The composition of claim 1, wherein the composition exhibits a viscosity of 1-30,000 mPa·s at 25° C. and 1014.25 hPa and a density of 0.9-1.20 g/mL.

5. The composition of claim 1, wherein the filler comprises an oxide of silicon, a metal oxide, or a mixture thereof.

6. The composition of claim 1, wherein component (A) is a hydrophobic fluid that exhibits a surface tension of from 26-45 millinewtons per meter.

7. The composition of claim 1, wherein component (A) has a weight-average molecular weight in a range of from 250-20,000 daltons.

8. The composition of claim 1, wherein the composition comprises at least 85% by weight component (A).

9. The composition of claim 1, wherein the subscripts a, b, b', c, c', c'', d, d', d'', and d''' each have a value of 0 to 100.

10. The composition of claim 1, wherein a pair of adjacent carbon atoms of $R^1$ are interrupted by an oxygen or nitrogen atom.

11. The composition of claim 1, wherein component (A) comprises $R^2$ radicals in a range of 1 to 15 mol % based on a sum of all $R^1$ and $R^2$ radicals in component (A).

12. The composition of claim 1, wherein component (A) consists of units having silicon atoms chemically bonded to four oxygen atoms.

13. The composition of claim 1, wherein $R^2$ is selected from the group consisting of hydrogen, methyl, and ethyl radicals.

14. The composition of claim 13, wherein $R^2$ comprises hydrogen radicals in an amount of 5 mol % or less based on the sum of all $R^1$ and $R^2$ radicals.

15. An aqueous detergent comprising:

a composition of claim 1; and a surfactant system, wherein the surfactant system includes at least one surfactant.

* * * * *